(12) United States Patent
Henderson et al.

(10) Patent No.: US 8,577,713 B2
(45) Date of Patent: *Nov. 5, 2013

(54) METHOD FOR MANAGING HUMAN RESOURCES

(75) Inventors: Mark A. Henderson, Cornwall, NY (US); Thomas E. Carr, Charlotte, NC (US); Brian T. Eck, Poughquag, NY (US); Philip J. Garofolo, Apex, NC (US); Mark A. Weber, Hampton, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/775,630

(22) Filed: May 7, 2010

(65) Prior Publication Data

US 2010/0223091 A1 Sep. 2, 2010

Related U.S. Application Data

(63) Continuation of application No. 11/162,428, filed on Sep. 9, 2005, now Pat. No. 7,788,180.

(51) Int. Cl.
*G06Q 10/00* (2012.01)

(52) U.S. Cl.
USPC ........ 705/7.25; 705/7.12; 705/7.13; 705/7.14

(58) Field of Classification Search
USPC ........... 705/7.11, 7.12, 7.13, 7.14, 7.15, 7.16, 705/7.17, 7.21, 7.23, 7.25
See application file for complete search history.

(56) References Cited

U.S. PATENT DOCUMENTS

| | | | |
|---|---|---|---|
| 6,049,776 A * | 4/2000 | Donnelly et al. | 705/7.14 |
| 6,266,659 B1 * | 7/2001 | Nadkarni | 705/7.14 |
| 6,275,812 B1 * | 8/2001 | Haq et al. | 705/7.14 |
| 6,289,340 B1 | 9/2001 | Puram et al. | |
| 6,578,005 B1 * | 6/2003 | Lesaint et al. | 705/7.14 |
| 6,678,671 B1 | 1/2004 | Petrovic et al. | |
| 2002/0046074 A1 | 4/2002 | Barton | |
| 2002/0055870 A1 | 5/2002 | Thomas | |
| 2002/0169658 A1 | 11/2002 | Adler | |

(Continued)

OTHER PUBLICATIONS

Matt Light, Bill Rosser, Simon Hayward. Realizing the Benefits of Porject and Portfolio Managment, Jan. 4, 2005, Gartner Research on Strategic Analysis Reporting.*
Noda, Tomo and Bower, Joseph. Strategy Making as Iterated Processes of Resource Allocation, Strategic Management Journal, vol. 17, 159-192 (1996).*
Boxall, Peter and Purcell, John. Strategic Human Resource Management: Where have we come from and where should we be going? Blackwell Publishers Ltd 2000. International Journal of Management Revewis vol. 2, Issue 2, p. 183-203 (Jun. 2000).*
Henderson et al., U.S. Appl. No. 11/162,428, Office Action Communication, Oct. 5, 2009, 17 pages.
Henderson et al., U.S. Appl. No. 11/162,428, Notice of Allowance, Apr. 26, 2010, 5 pages.

(Continued)

*Primary Examiner* — Jonathan G Sterrett
*Assistant Examiner* — Stephanie Delich
(74) *Attorney, Agent, or Firm* — Gibb & Riley, LLC; Yuanmin Cai, Esq.

(57) ABSTRACT

Disclosed herein is an integrated method and system for managing human resources. Specifically, the method and system integrates several processes (e.g., a process for developing a strategy and particularly for developing a set of rules on how human resources will be managed and sourced, a process for developing a long-term strategic plan for sourcing human resources to satisfy demands, a process for developing a near-term operational plan recommending individual human resources be used to satisfy selected demands, a process for selecting and assigning individual resources to specific engagements, etc.). Thus, the method operates through a spectrum of time horizons from the strategic to real time, providing a coherent and cohesive system for matching supply to demand based on the priorities of the business as represented through the set of rules.

22 Claims, 3 Drawing Sheets

(56) References Cited

U.S. PATENT DOCUMENTS

| | | |
|---|---|---|
| 2003/0004736 A1 | 1/2003 | Calderaro et al. |
| 2003/0055704 A1 | 3/2003 | Reece |
| 2003/0126059 A1* | 7/2003 | Hensley et al. ............ 705/36 |
| 2003/0126141 A1 | 7/2003 | Hassman et al. |
| 2003/0163357 A1 | 8/2003 | Engleman et al. |
| 2003/0172002 A1 | 9/2003 | Spira et al. |
| 2003/0177027 A1 | 9/2003 | DiMarco |
| 2004/0030566 A1* | 2/2004 | Brooks Rix ............... 705/1 |
| 2004/0054565 A1 | 3/2004 | Nemecek et al. |
| 2004/0059588 A1 | 3/2004 | Burritt et al. |
| 2004/0064329 A1 | 4/2004 | Broad et al. |
| 2004/0095378 A1 | 5/2004 | Vigue et al. |
| 2004/0162771 A1 | 8/2004 | Tamatsu et al. |
| 2005/0033620 A1 | 2/2005 | Gloor et al. |
| 2005/0119914 A1 | 6/2005 | Batch |
| 2007/0073565 A1* | 3/2007 | D'Heedene et al. ............ 705/7 |
| 2007/0073576 A1* | 3/2007 | Connors et al. ............ 705/10 |

OTHER PUBLICATIONS

Matt Light, Bill Rosser, Simon Hayward, "Realizing the Benefits of Project and Portfolio Management," Jan. 4, 2005, Gartner Research on Strategic Analysis Reporting.

Noda, Tomo and Bower, Joseph, "Strategy Making as Iterated Processes of Resource Allocation," Strategic Management Journal, vol. 17, 159-192, 1996.

Boxall, Peter and Purcell, John, "Strategic Human Resource Management: Where have we come from and where should we be going?," Blackwell Publishers Ltd 2000. International Journal of Management Reviews, vol. 2, Issue 2, pp. 183-203, Jun. 2000.

* cited by examiner

METHOD FOR MANAGING HUMAN RESOURCES

CROSS-REFERENCE TO RELATED APPLICATIONS

This application is a Continuation of U.S. application Ser. No. 11/162,428 filed Sep. 9, 2005, now U.S. Pat. No. 7,788,180, Issued Aug. 31, 2010, the complete disclosure of which, in its entirety, is herein incorporated by reference.

BACKGROUND OF THE INVENTION

1. Field of the Invention

The invention generally relates to an integrated computer-implemented method for managing human resources and particularly, a computer-implemented method for managing resources that incorporates a supply management strategy, long and near-term supply planning and operational distribution of supplies.

2. Description of the Related Art

With increased competition and commoditization in the services segment, it is now necessary to improve the efficiency and effectiveness of supply chain balancing. There is a need to take a holistic approach in managing the extended, integrated supply chain for human resources. The supply/demand balancing must deliver optimal business results, in a defined, repeatable process. Currently no end-to-end integrated process exists which captures all human resources supply in a single place, matches this supply to demand and optimizes the supply/demand matching around business requirements. Overarching principles are needed to effectively govern the process, as well as metrics to ensure that benefit is delivered to the business.

SUMMARY OF THE INVENTION

In view of the foregoing an embodiment of the invention provides a method and system for managing human resources with different skills. Specifically, disclosed is an integrated method and system for developing a strategy on how human resources will be managed and sourced, for planning at a gross level for resource assignment in both near and long term time horizons, and for selecting and assigning individual resources to specific engagements. The method of the invention is particularly applicable in environments in which human resources having different skills are offered as tangible commodities to perform services (e.g., medical services, legal services, computer services, training services, laborers, etc.).

The method comprises first developing a human resources management strategy for the determination of resource needs to support the companies business strategy and particularly, a set of rules based on a business strategy and a human resources strategy. The set of rules is periodically (e.g., biannually, annually, semi-annually) developed to provide guidelines for sourcing human resources with different skills and for assigning those human resources to satisfy service contracts. Specifically, the rules are developed to provide guidelines for obtaining human resource supplies from internal or external sources and to provide guidance on the financial viability (i.e., business benefits) of any plans which are developed for sourcing the resources and for assigning them to service contracts. For example, the rules can identify supply sources to be used to satisfy demands for the different skills, can prioritize the supply sources and can prioritize application of supplies to satisfy demands. The rules can also set target supply bench levels, set target investment levels for training, or set target investment levels for acquisition.

Additionally, a record of human resources supplies available internally and optionally, externally, including a list of the different skills of each of the human resources and an indication of availability of each of the individual human resources, is maintained. The different skills of each individual resource are periodically assessed and the record is updated so that the different skills of each resource can be tracked as they are trained, transitioned out of the business, acquired, etc.

Based on the most-recent set of rules, a resource capacity planning and optimization process is used to develop a first-level plan on a periodic (e.g., quarterly or monthly) basis. The first-level plan is developed for sourcing human resources to satisfy ongoing demands, future demands and possible demands for the different skills over an extended time period (e.g., over long term period such as a period of approximately 24 months). To develop the first-level plan, supplies and demands are evaluated. Specifically, records of ongoing engagements, future engagements and possible engagements are reviewed to determine for each engagement, the different skills required. Then, a demands list is developed comprising a listing of each of the ongoing demands, the future demands, and the possible demands for each of the different skills. A determination is then made as to which supply sources can satisfy each of the demands on the demands list and the first-level plan is developed. For example, a determination is made as to which and/or how much of the demand should be satisfied by currently available internal supplies considering the record of human resources, supplies available through out-sourcing, supplies available through acquisition, or supplies available through skill development.

Based on a most-recent of the first-level plans, on the most-recent set of rules, on the demand list and on the record of human resources, an operational resource optimization process is used to develop a second-level plan on a periodic (e.g., monthly or weekly) basis. The second-level plan is developed more frequently than the first-level plan. The second-level plan recommends assignment of individual human resources to satisfy selected demands within a second (near-term) time period that is less than the extended first time period. Thus, the second-level plan covers any demand which require action within the second time period (e.g., within the next week, month, 6-months, etc.). Specifically, in order to develop the second-level plan the most-recent first-level plan is reviewed and the demands list is updated. At least one demand (i.e., a selected demand) which requires action with a given time frame (i.e., within the second time period) is selected from the demand list. Then, considering current availability, the different skills required to satisfy the selected demand, and the set of rules, an individual human resource is identified from the record of human resources and recommended for assignment to satisfy the selected demand.

When a time for action on a selected demand approaches, a resource assignment evaluation process will be used to select and assign an individual human resource to satisfy the demand. In order to select and assign at least one individual human resource to satisfy at least one selected demand, the record of human resources is reviewed to determine the availability of at least one individual human resource that was recommended for assignment in the second-level plan. Then, pricing information related to the engagement associated with the selected demand is reviewed, for example, to determine if the cost of supplying the individual human resource recommended in the second-level plan fits within the cost guidelines established for the engagement. The individual human resource recommended for assignment in the second level plan will be assigned to satisfy the selected demand based availability, on the pricing information, and on the set of rules. If the recommended individual is not available, too costly or otherwise unsuitable for assignment to the position, a different individual human resource can be assigned from internal supplies. Alternatively, a determination can be made based on the set of rules that it would be more financially viable to source the individual human resource required to satisfy the selected demand through out-sourcing or acquisition (i.e., hiring a new resource to satisfy the demand).

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
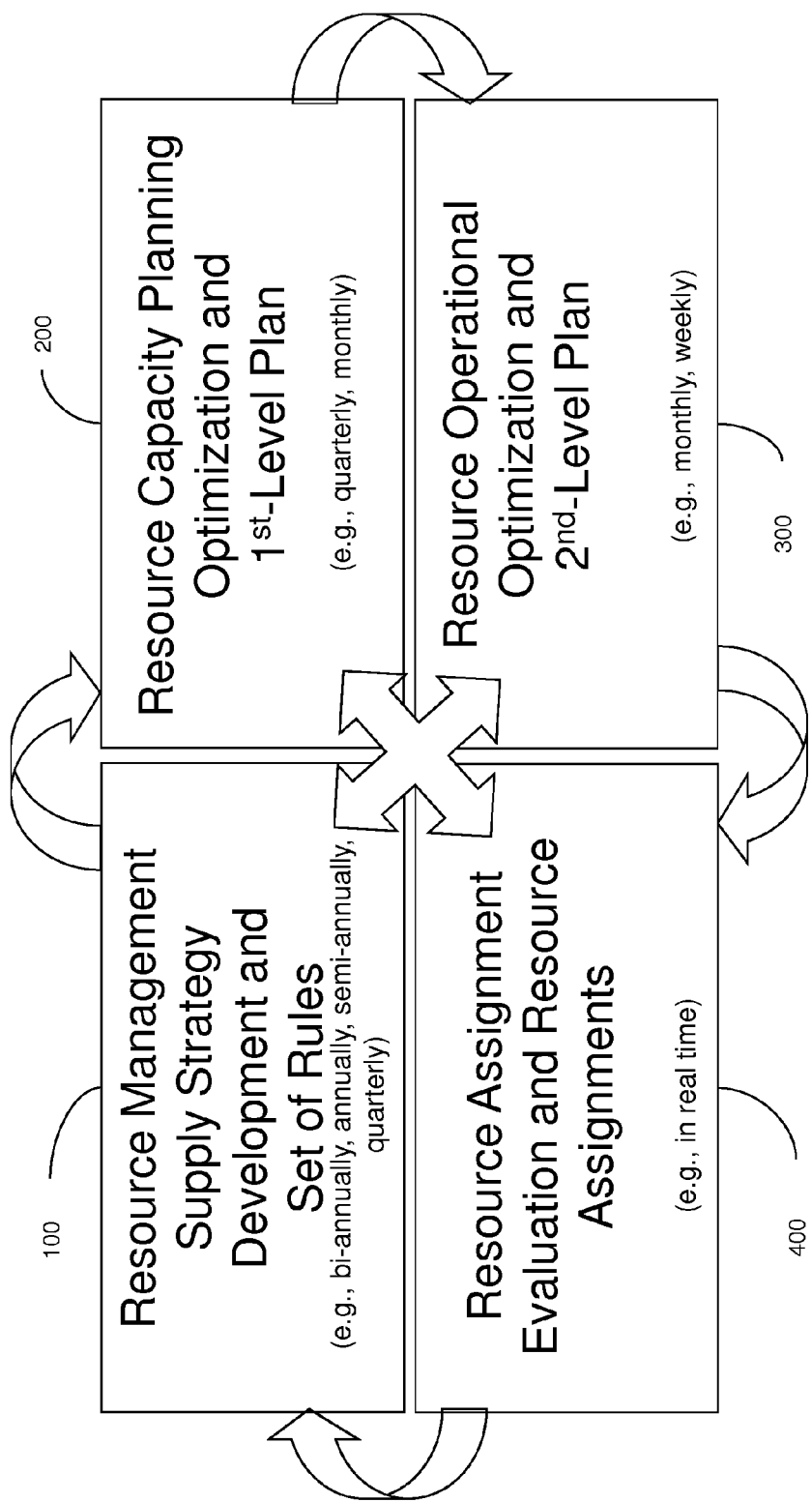
FIG. 1 illustrates a schematic diagram of an embodiment of the method of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

In view of the foregoing an embodiment of the invention provides a method and system for managing human resources with different skills. Specifically, disclosed is an integrated method and system for developing a strategy on how human resources will be managed and sourced, for planning at a gross level for resource assignment in both near and long term time horizons, and for selecting and assigning individual resources to specific engagements. The method of the invention is particularly applicable in environments in which human resources having different skills are offered as tangible commodities to perform services (e.g., medical services, legal services, computer services, training services, laborers, etc.). The method operates through a spectrum of time horizons from the strategic to real time, providing a coherent and cohesive system for matching supply to demand based on the priorities of the business. The method of effective balancing of supply and demand based on business priorities can be used to improve profitability, customer satisfaction and employee satisfaction.

Referring to FIG. 1, the method may be segmented into four integrated processes: resource management supply strategy development 100, resource capacity planning optimization 200, resource operational optimization 300 and resource assignment evaluation 400. Developing a resource management supply strategy 100 generally comprises strategically defining resource needs in support of a business strategy and based on those needs developing a prescribed identification of supply source and a set of rules for sourcing human resources with different skills and for assigning individual human resources with different skills. Optimizing resource capacity planning 200 generally comprises matching resource demand to supply in the tactical and strategic horizon to provide an optimized recommended gross level plan (i.e., a first-level plan) of time bucketed (i.e., long term) aggregate resource needs or shortages by skill set, determined based on the above-mentioned set of rules. Optimizing resources operationally 300 generally comprises matching resource demand to supply in the operation horizon to provide an optimized recommended more granular plan (i.e., a second-level plan) of time bucketed (i.e., short term) resource needs or shortages by skill set, determined based on the first-level plan and the above-mentioned set of rules. Lastly, evaluating resource assignment 400 comprises evaluating those resources recommended for assignment at process 300 in light of availability, pricing considerations and the above-mentioned set of rules in order to provide real-time resource assignments to a specific client for an engagement and also provides an available to promise statement.

Figure 2:
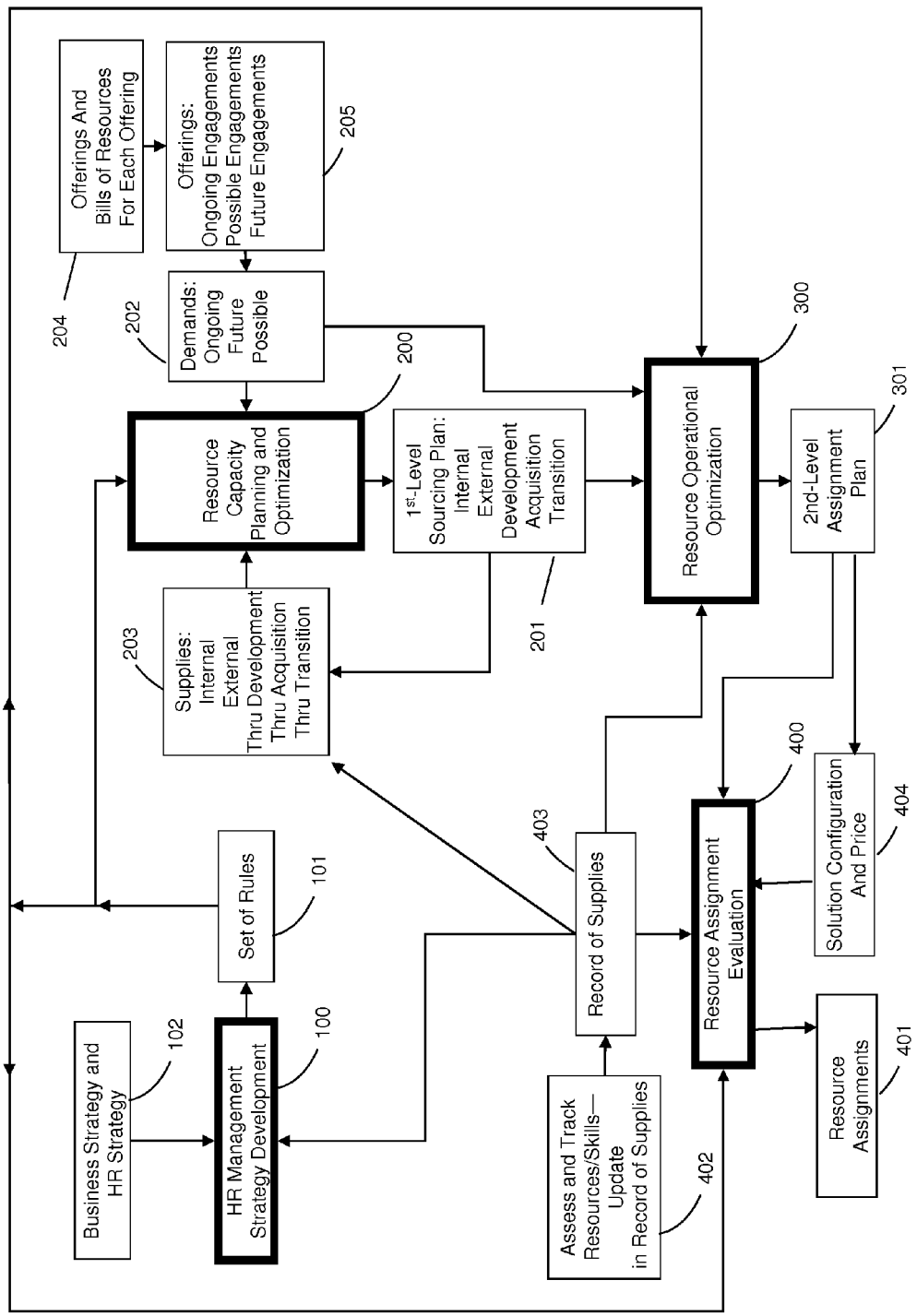
FIG. 2 illustrates a schematic diagram of an embodiment of the method of the invention.

More particularly, referring to FIG. 2, the method comprises first developing a human resources management supply strategy 100 for the determination of resource needs to support the companies business strategy. The human resources management supply strategy 100 is based on input from the business strategy and a human resources strategy 102 and input from a record of resources 403, including a current view of skills available from internal and external (i.e., available through out-sourcing) resources. The business strategy provides the framework for which service segments the business will compete, determining the offerings which will be presented to the market place. Additionally, overall profitability and revenue targets are driven by the business strategy process. The human resources strategy is focused on which resources and skills should be recruited and developed internally versus which resources and skills will be procured externally (i.e., out-sourced). The synthesis of these inputs results is the development of a human resources management strategy 100 and, particularly, identification of prescribed sources of supply from the record of supplies 403 and a set of rules 101 for sourcing human resources with different skills and for assigning individual human resources with different skills to particular engagements (i.e., contracts for services). The set of rules 101 is developed periodically (e.g., biannually, annually, semi-annually) so that it may be adjusted as the business dynamics change over time. These rules are developed particularly to provide guidelines for obtaining human resource supplies from internal or external sources, to provide guidelines for assigning human resources and to provide guidance on the financial viability (i.e., business benefits) of any plans which are developed for sourcing and assigning individual human resources. Thus, these rules are applied consistently throughout all four of the integrated processes 100-400 to ensure that the method is repeatable. Exemplary rules can identify supply sources to be used to satisfy demands for the different skills, can prioritize the supply sources and can also prioritize application of supplies to satisfy demands. Additionally, exemplary rules can set target supply bench levels, set target investment levels for training, or set target investment levels for acquisition.

In order to facilitate each of the integrated processes 100-400 of the method a record (i.e., a data repository) of internal human resource supplies, and optionally external (i.e., available via out-sourcing from other suppliers) human resources supplies 403, including a list of the different skills of each of the human resources and an indication of availability of each of the individual human resources, is maintained. The different skills of each individual resource are periodically assessed and the record is updated 402 so that the different skills of each resource (i.e., individual employee) can be tracked as they are trained, transitioned out of the business, acquired, etc. This process can also be used to reserve and assign at process 400, described below, individual employees for opportunities viewed to be especially important.

Based on the most-recent set of rules 101, a resource capacity planning and optimization process 200 is used to develop a first-level plan 201 on a periodic (e.g., quarterly or monthly) basis. The first-level plan 210 is a gross level plan developed for sourcing human resources (i.e., specifying the supply sources of human resources) to satisfy ongoing demands, future demands and possible demands for the different skills over an extended time horizon (i.e., over a first time period such as approximately 24 months). To develop the first-level plan 201, supplies 203 and demands 202 are evaluated to rationalize supplies 203 to requirements driven by demands 202 and optimizing the result around the set of rules 100.

To determine demands 202, a business' offerings are managed 204 by planning and defining new marketplace offerings, including the labor-related staffing assumptions for skill, on/off-site, level and sourcing considerations. In conjunction with offerings management 204 (i.e., management of services offered), bills of resources, including listings of the quantity and types of different skills required to meet a particular service offered are developed for each offering. Additionally, a record of offerings 205 is developed and can comprise a listing of ongoing engagements (i.e., existing contracts), a listing of future engagements (i.e., offering forecasts including planned future offerings which will require the development or acquisition of new skills or repackaging of existing skills into new offerings) and a listing of possible engagements (i.e., prospective engagements via an opportunity pipeline with various probabilities of materializing into actual firm engagements at specific times throughout the first time period). The record of offerings 205 is reviewed in light of the corresponding bills of resources for each offering to determine for each existing, future and possible engagement, the demands for the different skills required. Then, the demands list 202 is developed comprising a listing of each of the ongoing demands, the future demands, and the possible demands for each of the different skills over the extended period of time.

To determine supplies 203 the following are considered: currently available internal supplies as indicated in the record of human resources 403, supplies available through out-sourcing (e.g., contracting the human resources from outside the company), supplies available through acquisition, or supplies available through skill development. There is a collaborative process conducted with the human resources managers of a business on the quantity and timing of resources which are being acquired into the business and on resources which are being transitioned out of the business. Additionally, additionally resources which are undergoing skills upgrades are assessed and tracked 402 so that both quantity and timing of when the new skills will be available can be considered when developing the first-level plan 201. A determination is then made as to which supply sources can satisfy each of the demands on the demands list and the first-level plan is developed. Specifically, the first-level plan 201 can provide details on the number and type of skills which will be sourced from the various internal supplies considering the record of human resources supplies, the number and type of skills which will be out-sourced, the number and type of skills which must be retrained (i.e., made available through skill development), the number and type of skills which will be hired (i.e., made available through acquisition), as well as the number and type of skills which will be transitioned out of the business. The first-level plan 201 can also provide the timeframe in which all of these actions must be completed to satisfy the planned demand.

Based on a most-recent of the first-level plans 201, on the most-recent set of rules 101, on the demands list 202 and on the record of human resources 403, a resource operational optimization process 300 is used to develop a second-level plan 301 on a periodic (e.g., monthly or weekly) basis. The second-level plan 301 is developed less often than the first-level plan 201 and recommends assignment of specific individual human resources to satisfy selected demands within the operational horizon. Specifically, the second-level plan 301 covers any demands which require action within a second time period (e.g., within the next week, month, 6-months, etc.) that is less than the first time period covered by the first-level plan 201). In order to develop the second-level plan 301 the most-recent first-level plan 201 is reviewed and the demands list 202 (including existing demands, forecast demands, and possible demands) is updated. At least one demand (i.e., a selected demand) which requires action with the given time frame (i.e., within the second time period) is selected from the demands list. Then, considering current availability, the different skills required to meet the selected demand, and the set of rules, an individual human resource is identified from the record of human resources 403 and recommended for assignment to satisfy the selected demand 301.

When a time for action on a selected demand approaches (i.e., in the current time horizon), a resource assignment evaluation process 400 will be used to select and assign 401 an individual human resource to satisfy the demands for different skills associated with new engagements or existing engagements requiring additional resources in the current time horizon. In order to select and assign 401 at least one individual human resource to satisfy at least one selected demand, the record of human resources 403 is reviewed to determine the availability of the at least one individual human resource that was recommended for assignment in the second-level plan. Then, pricing information 404 related to the engagement associated with the selected demand is determined and reviewed. Specifically, a solution configuration and pricing process is conducted which involves estimating resource components needed for a solution for a specific client based on offering guidelines and pricing that solution. These estimates are used, for example, to determine if the cost of supplying the individual human resource recommended in the second-level plan fits within the cost guidelines established for the engagement. The individual human resource recommended for assignment in the second level plan will be assigned to satisfy the selected demand based availability as indicated by the record 403, on the pricing information 404, and also on the set of rules 101. If the recommended individual is not available, too costly or otherwise unsuitable for assignment to the position, a different individual human resource can be assigned from internal supplies. Alternatively, a determination can be made at this time based on the set of rules 101 that it would be more financially viable to source the individual human resource required to satisfy the selected demand through out-sourcing (e.g., contracting out or otherwise obtaining the human resource from a source outside the company) or acquisition (i.e., hiring a new resource to satisfy the demand).

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
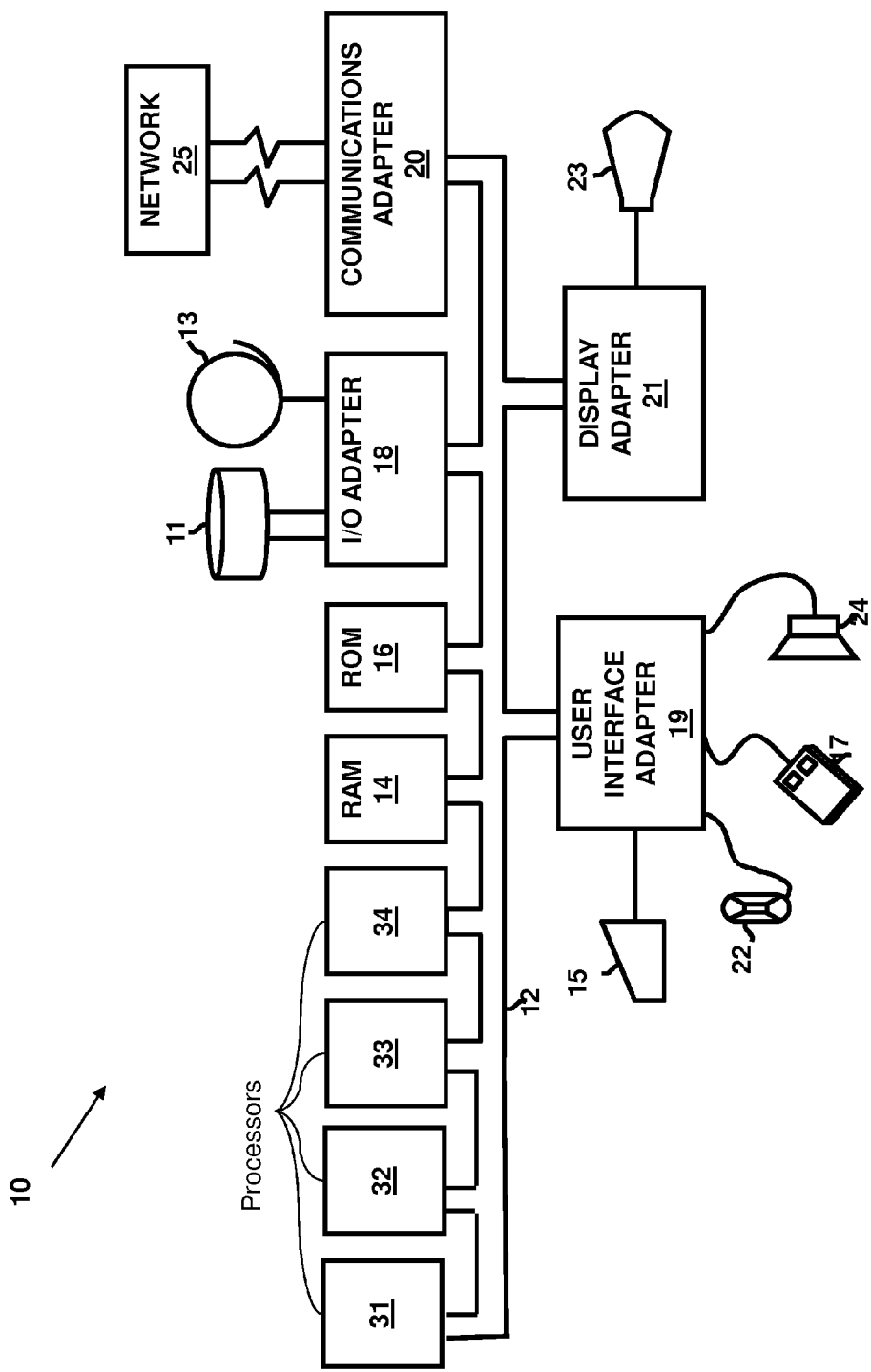
FIG. 3 illustrates a schematic diagram of an embodiment of a system of the invention.

A representative hardware system 10 for managing human resources with different skills is depicted in FIG. 3. This schematic drawing illustrates a hardware configuration of an information handling/computer system 10 in accordance with the embodiments of the invention. The system can comprise processors (e.g., first through fourth processors 31-34) or central processing units (CPU). The processors are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

As mentioned above, an exemplary embodiment of the system can comprise first through fourth processors 31-34. For example, the first processor 31 can be adapted for use in developing a resource management supply strategy (see discussion above regarding item 100 of FIGS. 1-2) and, specifically, adapted to periodically develop a set of rules for sourcing human resources (i.e., specifying the supply sources for human resources) based on an inputs such as a business plan and a human resources plan. The second processor 32 can be adapted for use in optimizing resource capacity planning (see discussion above regarding item 200 of FIGS. 1-2) and, specifically, adapted to periodically develop a first-level plan to supply the human resources to satisfy demands for the different skills according to a set of rules. The third processor 33 can be adapted for use in operationally optimizing resources (see discussion above regarding item 300 of FIGS. 1-2) and, specifically, adapted to periodically develop a second-level plan that recommends assignment of at least one individual human resource to satisfy at least one selected demand according to the set of rules and a most-recent of the first-level plans. Lastly, the fourth processor can be adapted for use in evaluating resource assignments (see discussion above regarding item 400 of FIGS. 1-2) and, specifically, adapted to periodically assign individual human resources to satisfy selected demands based on availability, on pricing information, on the second-level plan and on the set of rules.

The memory devices 14, 16 can be accessible by each of the processors and can be used to maintain a plurality of data repositories such as a record of the human resources supplies (see description above of item 403 of FIG. 2), a record of the most recent set of rules (see description above of item 101 of FIG. 2), a record of the most recent first-level plan (see description above of item 201 of FIG. 2) and a record of the most recent second-level plan (see description above of item 301 of FIG. 2). Additional data stored in the memory devices 14, 16 of the system 10 can include bills of resources for each offering (see description above of item 204 of FIG. 2), records of offerings (see description above of item 205 of FIG. 2), a demands list (see description above of item 202 of FIG. 2), etc.

The embodiments of the computer implemented method and system, described above, disclose an integrated method and system for developing a strategy on how human resources will be managed and sourced, for planning at a gross level for resource assignment in both near and long term time horizons, and for selecting and assigning individual resources to specific engagements. Specifically, embodiments of the method provide for a procedural integration of a company's business strategy through planning and operational processes. When supported with a management and measurement system, this integrated and dynamic approach ensures that planning and operational activities are performed consistent with a company's business objectives. By regularly integrating a company's financial objectives, included in their business strategies, with identified sources of supplies and a set of rules for allocating those supplies to demands can results in a more cost-efficient and time-efficient management of the allocation of human resources. Additionally, by using the prescribed sources of supply and set of sourcing rules to plan resource allocation, circumstances in which investment and/or communication is required can be proactively identified (e.g., conditions with long lead times, such as developing and training of human resources, recruiting and hiring of human resources, and negotiating and securing external sources of human resources. Furthermore, by using the prescribed sources of supply and set of sourcing rules, circumstances requiring a rebalancing of resources across business lines within a company as well as the specific individual identification of resources that should be assigned to fulfill specific business needs can be proactively identified (e.g., specific individual(s) that should be reassigned to other business lines can be identified, specific individual(s) requiring training can be identified, etc.). Lastly, by using the prescribed sources of supply and set of sourcing rules specific individuals can be identified and operationally assigned to a customer account or engagement. Thus, by using the prescribed sources of supply and set of sourcing rules throughout the four integrated and closed-loop processes (discussed above), continuity of resource supply allocation to resource demand in the operational assignment of resources is ensured.

Therefore, disclosed above is a closed-loop integrated method and system for managing human resources with different skills. Specifically, the method and system integrates at least two of the following processes: a process for developing a strategy and particularly for developing a set of rules on how human resources will be managed and sourced, a process for developing a long-term strategic plan for sourcing human resources to satisfy demands, a process for developing a near-term operational plan recommending individual human resources be used to satisfy selected demands, a process for selecting and assigning individual resources to specific engagements, etc. The method of the invention is particularly applicable in environments in which human resources having different skills are offered as tangible commodities to perform services. The method operates through a spectrum of time horizons from the strategic to real time, providing a coherent and cohesive system for matching supply to demand based on the priorities of the business as represented through the set of rules. The method of effective balancing of supply and demand based on business priorities can be used to improve profitability, customer satisfaction and employee satisfaction.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that the invention can be practiced with modification within the spirit and scope of the appended claims.

What is claimed is:

1. A computer implemented method of managing human resources comprising:
   maintaining and periodically updating, on a memory device of a computer system of a company, a record of human resource supplies, said human resource supplies comprising a plurality of individual human resources available from internal and external supply sources with respect to said company and said record of said human resource supplies comprising a list of different skills of each of said individual human resources and an indication of availability of each of said individual human resources;
   providing a business strategy that drives profitability and revenue targets;
   based on said business strategy and said record of human resource supplies, periodically developing, by said computer system, a set of rules providing guidelines for obtaining said human resource supplies and for assigning said individual human resources to satisfy demands on a demands list;
   based on said set of rules and on said record of human resource supplies, periodically developing, by said computer system, a first-level plan specifying which of said supply sources should be used, over a specified first time period, to satisfy said demands on said demands list, said first-level plan being periodically developed at shorter intervals than said set of rules; and
   based on said first-level plan, on said demands list, on said record of human resources supplies and on said set of rules, periodically developing, by said computer system, a second-level plan, said second-level plan recommending assignment of specific individual human resources to satisfy any specific demands that are on said demands list and that have required action times falling within a next specified second time period, said next specified second time period being within said specified first time period and said second-level plan being periodically developed at shorter intervals than said first-level plan such that said second-level plan comprises a short-term plan as compared to said first-level plan; and,
   when a required action time for a specific demand approaches within said next specified second time period, performing the following:
      determining current availability of a specific individual human resource recommended for assignment to said specific demand in said second-level plan;
      reviewing pricing information to determine whether a cost of assigning said specific individual human resource to satisfy said specific demand is within previously established cost guidelines; and
      assigning said specific individual human resource to satisfy said specific demand based on said current availability, on said pricing information, and on said set of rules.

2. The method of claim 1, said developing of said set of rules comprising:
   identifying supply sources that have said human resource supplies;
   prioritizing said supply sources;
   prioritizing application of said human resources supplies to satisfy said demands on said demands list; and
   setting at least one of target supply bench levels, target investment levels for training, and target investment levels for acquisition.

3. The method of claim 2, said developing of said first-level plan comprising:
   determining said demands list, said demands list comprising a listing of demands for each different skill; and
   determining which of said supply sources can satisfy each of said demands on said demands list based on said set of rules, said supply sources comprising at least one of currently available supplies, supplies available through out-sourcing, supplies available through acquisition, and supplies available through skill development.

4. The method of claim 3, said developing of said first-level plan further comprising planning how many of each of said demands on said demands list should be satisfied by each of said supply sources.

5. The method of claim 3, said determining of said demands list comprising:
- determining ongoing engagements, future engagements and possible engagements; and
- determining each of said different skills required for each of said ongoing engagements, said future engagements, and said possible engagements.

6. The method of claim 3, said developing of said second-level plan comprising:
- reviewing a most-recent first-level plan;
- updating said demands list;
- selecting said specific demand from said demands list;
- identifying said specific individual human resource that is currently available, that has said different skills required to satisfy said specific demand, and that can be assigned based on said set of rules; and
- recommending assignment of said specific individual human resource to satisfy said specific demand.

7. A computer implemented method of managing human resources comprising:
- maintaining and periodically updating, on a memory device of a computer system of a company, a record of human resource supplies, said human resource supplies comprising a plurality of individual human resources available from internal and external supply sources with respect to said company and said record of said human resource supplies comprising a list of different skills of each of said individual human resources and an indication of availability of each of said individual human resources;
- providing a business strategy that drives profitability and revenue targets in a services environment;
- based on said business strategy and said record of human resource supplies, periodically developing, by said computer system, a set of rules providing guidelines for obtaining said human resource supplies and for assigning said individual human resources to satisfy demands on a demands list;
- based on said set of rules and on said record of human resource supplies, periodically developing, by said computer system, a first-level plans specifying which of said supply sources should be used, over a specified first time period, to satisfy said demands on said demands list, said first-level plan being periodically developed at shorter intervals than said set of rules and said demands comprising ongoing demands, future demands and possible demands; and
- based on said first-level plan, on said demands list, on said record of human resources supplies and on said set of rules, periodically developing, by said computer system, a second-level plan recommending assignment of specific individual human resources to satisfy any specific demands that are on said demands list and that have required action times falling within a next specified second time period, said next specified second time period being within said specified first time period and said second-level plan being periodically developed at shorter intervals than said first-level plan such that said second-level plan comprises a short-term plan as compared to said first-level plan; and
- when a required action time for a specific demand approaches within said next specified second time period, performing the following:
  - determining current availability of a specific individual human resource recommended for assignment to said specific demand in said second-level plan;
  - reviewing pricing information to determine whether a cost of assigning said specific individual human resource to satisfy said specific demand is within previously established cost guidelines; and
  - assigning said specific individual human resource to satisfy said specific demand based on said current availability, on said pricing information, and on said set of rules.

8. The method of claim 7, said developing of said set of rules comprising:
- identifying supply sources that have said human resource supplies;
- prioritizing said supply sources,
- prioritizing application of said human resource supplies to satisfy said demands on said demands list; and
- setting at least one of target supply bench levels, target investment levels for training, and target investment levels for acquisition.

9. The method of claim 7, said developing of said first-level plan comprising:
- determining said demands list, said demands list comprising a listing of said ongoing demands, said future demands, and said possible demands for each different skill; and
- determining which of said supply sources can satisfy each of said ongoing demands, said future demands, and said possible demands on said demands list based on said set of rules, said supply sources comprising at least one of currently available supplies, supplies available through out-sourcing, supplies available through acquisition, and supplies available through skill development.

10. The method of claim 9, said developing of said first-level plan further comprising planning how many of each of said ongoing demands, said future demands, and said possible demands, on said demands list should be satisfied by each of said supply sources.

11. The method of claim 9, said determining of said demands list comprising:
- determining ongoing engagements, future engagements and possible engagements; and
- determining each of said different skills required for each of said ongoing engagements, said future engagements, and said possible engagements.

12. The method of claim 9, said developing of said second-level plan comprising:
- reviewing a most-recent first-level plan;
- updating said demands list;
- selecting said specific demand from said demands list;
- identifying said specific individual human resource that is currently available, that has said different skills sufficient to satisfy specific, and that can be assigned based on said set of rules; and
- recommending assignment of said specific individual human resource to satisfy said specific demand within said second time period.

13. A program storage device readable by computer, tangibly embodying a program of instructions executable by said computer to perform a method of managing human resources, said method comprising:
- maintaining and periodically updating a record of human resource supplies, said human resource supplies comprising a plurality of individual human resources available from internal and external supply sources with respect to a company and said record of said human resource supplies comprising a list of different skills of each of said individual human resources and an indication of availability of each of said individual human resources;

providing a business strategy that drives profitability and revenue targets;

based on said business strategy and said record of human resource supplies, periodically developing a set of rules providing guidelines for obtaining said human resource supplies and for assigning said individual human resources to satisfy demands on a demands list;

based on said set of rules and on said record of said human resource supplies, periodically developing a first-level plans specifying which of said supply sources should be used, over a specified first time period, to satisfy said demands on said demands list, said first-level plan being periodically developed at shorter intervals than said set of rules; and based on said first-level plan, on said demands list, on said record of human resources supplies and on said set of rules, periodically developing a second-level plan, said second-level plan recommending assignment of specific individual human resources to satisfy any specific demands that are on said demands list and that have required action times falling within a next specified second time period, said next specified second time period being within said specified first time period and said second-level plan being periodically developed at shorter intervals than said first-level plan such that said second-level plan comprises a short-term plan as compared to said first-level plan; and when a required action time for a specific demand approaches within said next specified second time period, performing the following:
  determining current availability of a specific individual human resource recommended for assignment to said specific demand in said second-level plan;
  reviewing pricing information to determine whether a cost of assigning said specific individual human resource to satisfy said specific demand is within previously established cost guidelines; and
  assigning said specific individual human resource to satisfy said specific demand based on said current availability, on said pricing information, and on said set of rules.

14. The program storage device of claim 13, said developing of said set of rules comprising:
  identifying supply sources that have said human resource supplies;
  prioritizing said supply sources,
  prioritizing application of said human resource supplies to satisfy said demands on said demands list; and
  setting at least one of target supply bench levels, target investment levels for training, and target investment levels for acquisition.

15. The program storage device of claim 13, said developing of said first-level plan comprising:
  determining said demands list, said demands list comprising a listing of demands for each different skill; and
  determining which of said supply sources can satisfy each of said demands on said demands list based on said set of rules, said supply sources comprising at least one of currently available supplies, supplies available through out-sourcing, supplies available through acquisition, and supplies available through skill development.

16. The program storage device of claim 15, said developing of said first-level plan further comprising planning how many of each of said demands on said demands list should be satisfied by each of said supply sources.

17. The program storage device of claim 15, said determining of said demands list comprising:
  determining ongoing engagements, future engagements and possible engagements; and
  determining each of said different skills required for each of said ongoing engagements, said future engagements, and said possible engagements.

18. The program storage device of claim 15, said developing of said second-level plan comprising:
  reviewing a most-recent first-level plan;
  updating said demands list;
  selecting said specific demand from said demands list;
  identifying said specific individual human resource that is currently available, that has said different skills required to satisfy said specific demand, and that can be assigned based on said set of rules; and
  recommending assignment of said specific individual human resource to satisfy said specific demand.

19. A system for managing human resources with different skills, said system comprising:
  a memory device storing a periodically updated record of human resource supplies, said human resource supplies comprising a plurality of individual human resources available from internal and external supply sources with respect to a company and said record of said human resource supplies comprising a list of different skills of each of said individual human resources and an indication of availability of each of said individual human resources;
  a first processor adapted to periodically develop, based on a business strategy that drives profitability and revenue targets and on said record of human resources supplies, a set of rules providing guidelines for obtaining said human resource supplies and for assigning said individual human resources to satisfy demands on demands list;
  a second processor in communication with said first processor and adapted to periodically develop, based on said set of rules and said record of human resource supplies, a first-level plans specifying which of said supply sources should be used, over a specified first time period, to satisfy said demands on said demands list, said first-level plan being periodically developed at shorter intervals than said set of rules; and
  a third processor in communication with said second processor and adapted to periodically develop, based on said first-level plan, on said demands list, on said record of human resource supplies, and on said set of rules, a second-level plan, said second-level plan recommending assignment of specific individual human resources to satisfy any specific demands that are on said demands list and that have required action times falling within a next specified second time period, said next specified second time period being within said specified first time period and said second-level plan being periodically developed at shorter intervals than said first-level plan such that said second-level plan comprises a short-term plan as compared to said first-level plan; and
  a fourth processor in communication with said first processor, said second processor, and said third processor, said fourth processor being adapted to perform the following, when a required action time for a specific demand approaches within said next specified second time period:

determine current availability of a specific individual human resource recommended for assignment to said specific demand in said second-level plan;

review pricing information to determine whether a cost of assigning said specific individual human resource to satisfy said specific demand is within previously established cost guidelines; and assign said specific individual human resource to satisfy said specific demand based on said current availability, on said pricing information, and on said set of rules.

20. The system of claim 19, said memory device further storing said set of rules.

21. The system claim 20, said demands on said demands list each comprising a demand for a different skill and said set of rules comprising at least one of a list of supply sources that may be used to acquire said different skills, a supply sources priority listing, a priority listing of said demands to be satisfied by said human resource supplies, and at least one of a target supply bench level, a target investment level for training, and target investment level for acquisition.

22. The system of claim 19, said memory device further storing said first-level plan and said second-level plan.

* * * * *